US012657901B2

(12) United States Patent　(10) Patent No.: US 12,657,901 B2
Zhang　(45) Date of Patent: Jun. 16, 2026

(54) METHOD AND APPARATUS FOR PROMPTING-BASED REHEARSAL-FREE CONTINUAL LEARNING WITH DYNAMIC PROTOTYPES-INVOLVED SELF-ATTENTION

(71) Applicant: Hong Kong Applied Science and Technology Research Institute Company Limited, Hong Kong (HK)

(72) Inventor: Ming Zhang, Pak Shek Kok (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 269 days.

(21) Appl. No.: 18/641,970

(22) Filed: Apr. 22, 2024

(65) Prior Publication Data

US 2025/0329151 A1　Oct. 23, 2025

(51) Int. Cl.
*G06V 10/00*　(2022.01)
*G06V 10/77*　(2022.01)
*G06V 10/82*　(2022.01)

(52) U.S. Cl.
CPC .......... *G06V 10/82* (2022.01); *G06V 10/7715* (2022.01)

(58) Field of Classification Search
CPC ........................... G06V 10/82; G06V 10/7715
See application file for complete search history.

(56) References Cited

U.S. PATENT DOCUMENTS

| | | | | |
|---|---|---|---|---|
| 2021/0383272 A1* | 12/2021 | Hua | ..................... | G06F 18/2431 |
| 2023/0274143 A1* | 8/2023 | Zhang | ..................... | G06N 3/096 |
| | | | | 706/20 |
| 2023/0385644 A1* | 11/2023 | Varma | ..................... | G06N 3/082 |
| 2024/0144019 A1* | 5/2024 | Weinzaepfel | .......... | G06N 3/084 |
| 2024/0249188 A1* | 7/2024 | Maia | ....................... | G06N 20/00 |
| 2025/0094819 A1* | 3/2025 | Byeon | ..................... | G06N 3/096 |
| 2025/0322259 A1* | 10/2025 | Zadeh | .................. | G06N 3/0985 |
| 2025/0330325 A1* | 10/2025 | Fortkort | .............. | G06V 10/764 |

OTHER PUBLICATIONS

Written Opinion of the International Searching Authority dated Dec. 11, 2024, issued by the China National Intellectual Property Administration in corresponding application PCT/CN2024/090475.
Notification of Transmittal of the International Search Report and the Written Opinion of the International Searching Authority, or the Declaration Dec. 11, 2024, issued by the China National Intellectual Property Administration in corresponding application PCT/CN2024/090475.
Zifeng Wang et al., Learning to Prompt for Continual Learning, arXiv:2112.08654v2, Mar. 21, 2022.

* cited by examiner

*Primary Examiner* — Van D Huynh
(74) *Attorney, Agent, or Firm* — Stein IP, LLC

(57) ABSTRACT

A method and apparatus for prompting-based rehearsal-free continual learning with dynamic prototypes-involved self-attention. A machine learning model with a base training set accepts continual new data inputs and use them to compute a prototype self-attention block which updates the model for the task associated with the new data without excessive or undesired overwriting of the existing model. Gini penalties are applied to the results of such computation to prevent excessive or undesired overwriting of the existing model.

11 Claims, 6 Drawing Sheets

Fig. 2

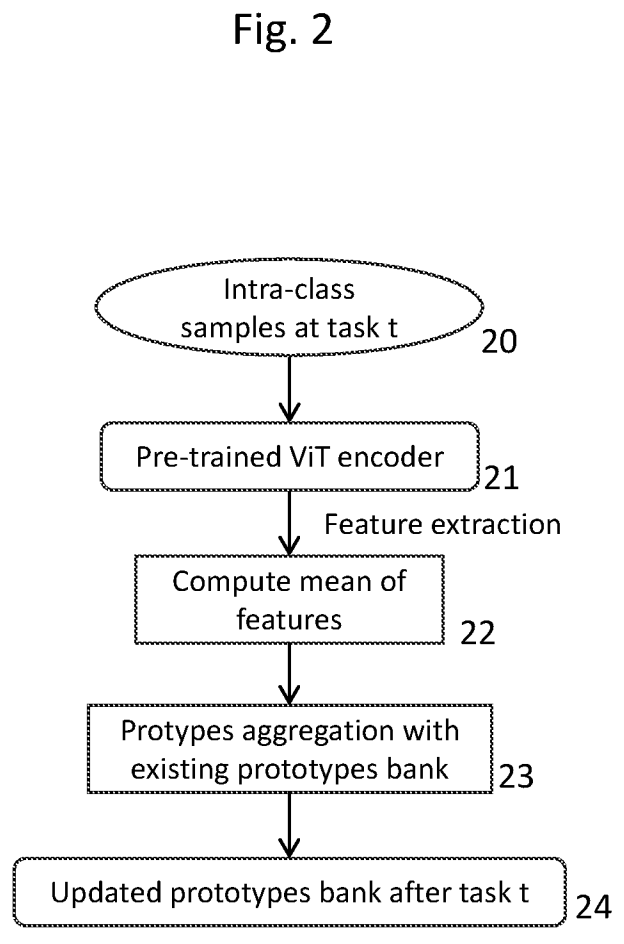

Intra-class samples at task t — 20

Pre-trained ViT encoder — 21

Feature extraction

Compute mean of features — 22

Protypes aggregation with existing prototypes bank — 23

Updated prototypes bank after task t — 24

Fig. 3

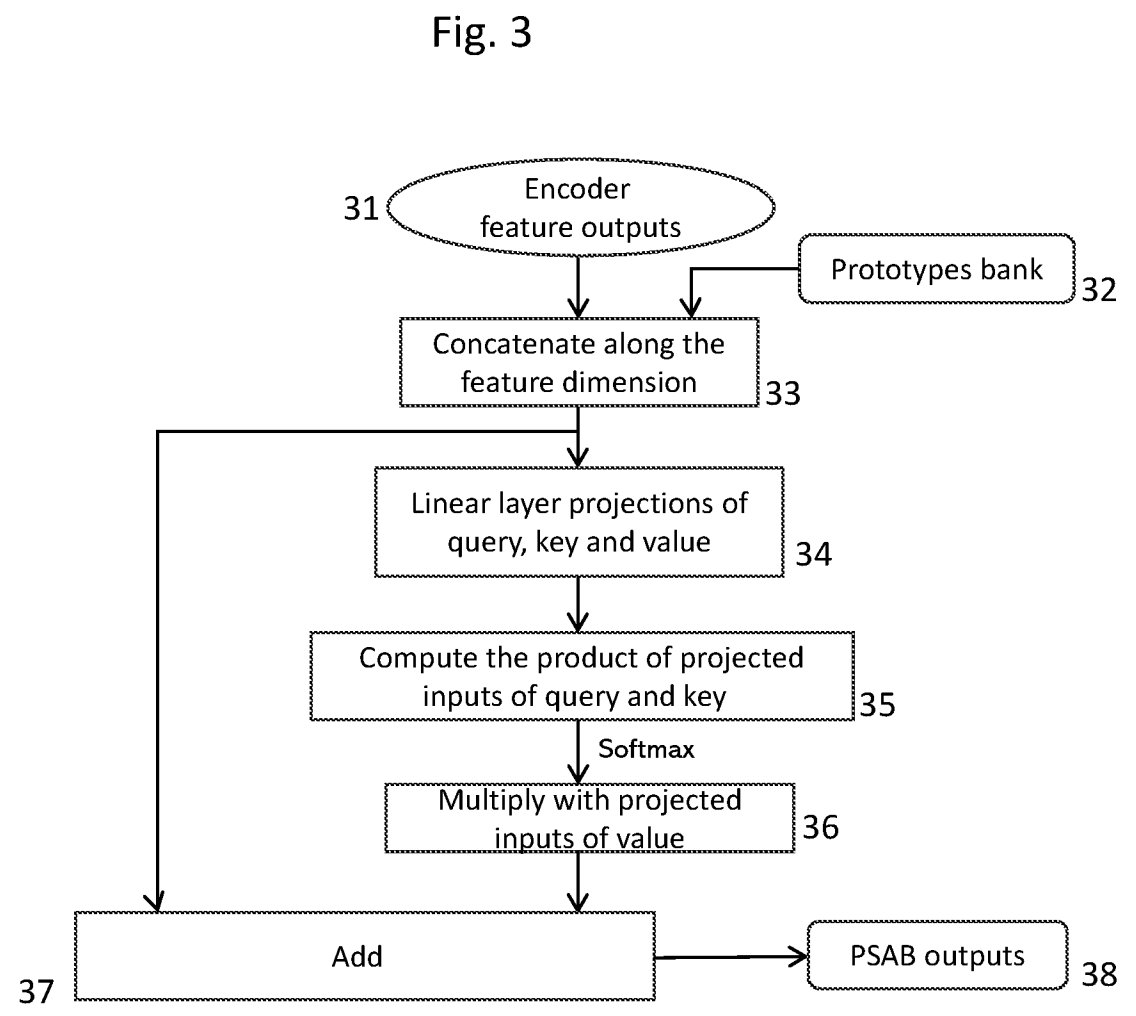

31 Encoder feature outputs

32 Prototypes bank

33 Concatenate along the feature dimension

34 Linear layer projections of query, key and value

35 Compute the product of projected inputs of query and key

Softmax

36 Multiply with projected inputs of value

37 Add

38 PSAB outputs

Fig. 4

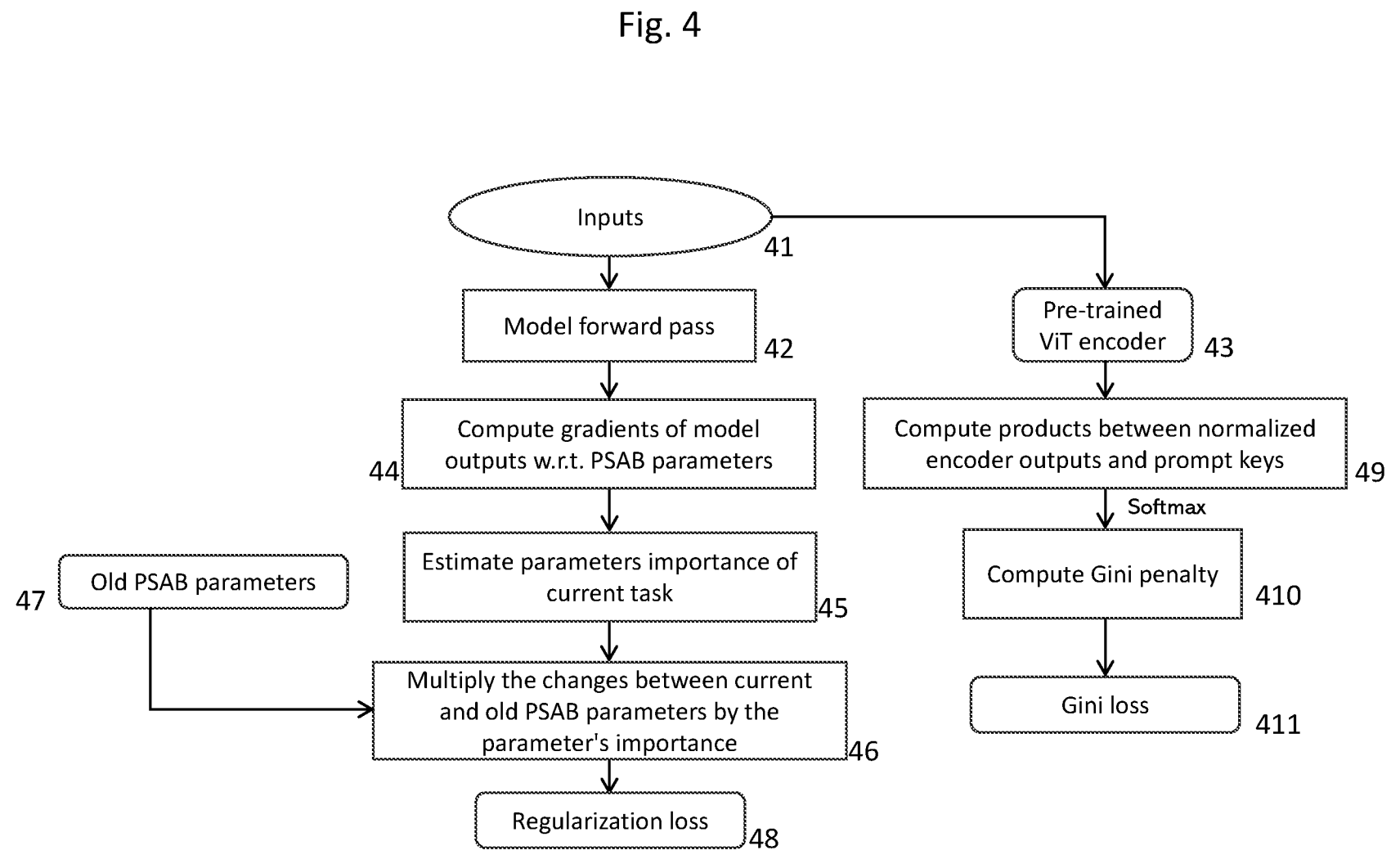

Inputs — 41

Pre-trained ViT encoder — 43

Compute products between normalized encoder outputs and prompt keys — 49

Softmax

Compute Gini penalty — 410

Gini loss — 411

Model forward pass — 42

Compute gradients of model outputs w.r.t. PSAB parameters — 44

Estimate parameters importance of current task — 45

Multiply the changes between current and old PSAB parameters by the parameter's importance — 46

Regularization loss — 48

Old PSAB parameters — 47

METHOD AND APPARATUS FOR PROMPTING-BASED REHEARSAL-FREE CONTINUAL LEARNING WITH DYNAMIC PROTOTYPES-INVOLVED SELF-ATTENTION

BACKGROUND OF THE INVENTION

1. Field of the Invention

Aspects of the present invention relate to a method for prompting-based rehearsal-free continual learning with dynamic prototypes-involved self-attention. It is particularly useful for quickly and efficiently updating a machine learning model when new data becomes available on a continual basis.

2. Description of the Related Art

Real-world data often arrives in a sequential manner, requiring associated machine learning models (hereafter "MLM" or "models") to be trained incrementally on new incoming data instead of the entire dataset simultaneously. Continual learning aims at tackling a sequence of tasks using a single model while avoiding performance degradation on previously learned tasks. Since a model when active in a real-world task only has access to the current task data, most state-of-the-art methods rely on a rehearsal buffer to re-train on a portion of past data examples. Recently, prompting-based methods enable models to learn a prompt pool as an alternative data-rehearsal. The prompt pool serves as a set of instructions to tune a frozen backbone of the model based on previous/original data examples to adapt to sequential new tasks.

However, this gives rise to new problems. For instance, rehearsal-based modelling methods suffer from substantial performance deterioration with small buffer size. Also, data privacy concerns may not allow a rehearsal buffer to be retained/accessed. In addition, existing prompting-based modelling methods lack utilization of backbone features of previous classes (prototypes), leading to insufficient resistance to excessive overwriting or "forgetting" the knowledge associated with previously learned tasks.

A method which can make the most of prototypes and develop a prototypes-involved prompting scheme for better old knowledge consolidation and new knowledge acquisition would be a useful invention. An apparatus for implementing such a method would also be a useful invention. A method for prompting-based rehearsal-free continual learning with dynamic prototypes-involved self-attention to allow faster, more efficient updating of machine learning models would be a useful invention, as would an apparatus for implementing such a method. Aspects of the present invention address these concerns.

SUMMARY OF THE INVENTION

Aspects of the present invention include a method for prompting-based rehearsal-free continual learning with dynamic prototypes-involved self-attention and a device for implementing such a method.

Aspects of the present invention is a method for prompting for rehearsal-free continual learning. It computes newly class-wise prototypes after the training stage of each task and conducts self-attention for a Prototypes-involved Self-attention Block or "PSAB" module. Conventionally, most existing methods require a rehearsal buffer to store past data for experience replay, which, however, may not be available in real world scenarios due to privacy and/or memory/storage constraints. In addition, as noted above existing methods lack utilization of backbone features of previous classes (prototypes), which would lead to insufficient resistance to excessive overwriting or "forgetting" the knowledge associated with previously learned tasks.

Aspects of the invention provides a method for rehearsal-free continual learning which includes the steps of computing newly class-wise prototypes after the training stage of each task and conducting self-attention for the PSAB module.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flow chart for the steps of the method related to prototype computation.

FIG. 3 is a flow chart for the steps of the method related to computing the prototype-involved self-attention block.

FIG. 4 is a flow chart for the steps of the method related to computing regularization loss and Gini loss.

DETAILED DESCRIPTION OF THE EMBODIMENTS

Figure 1:
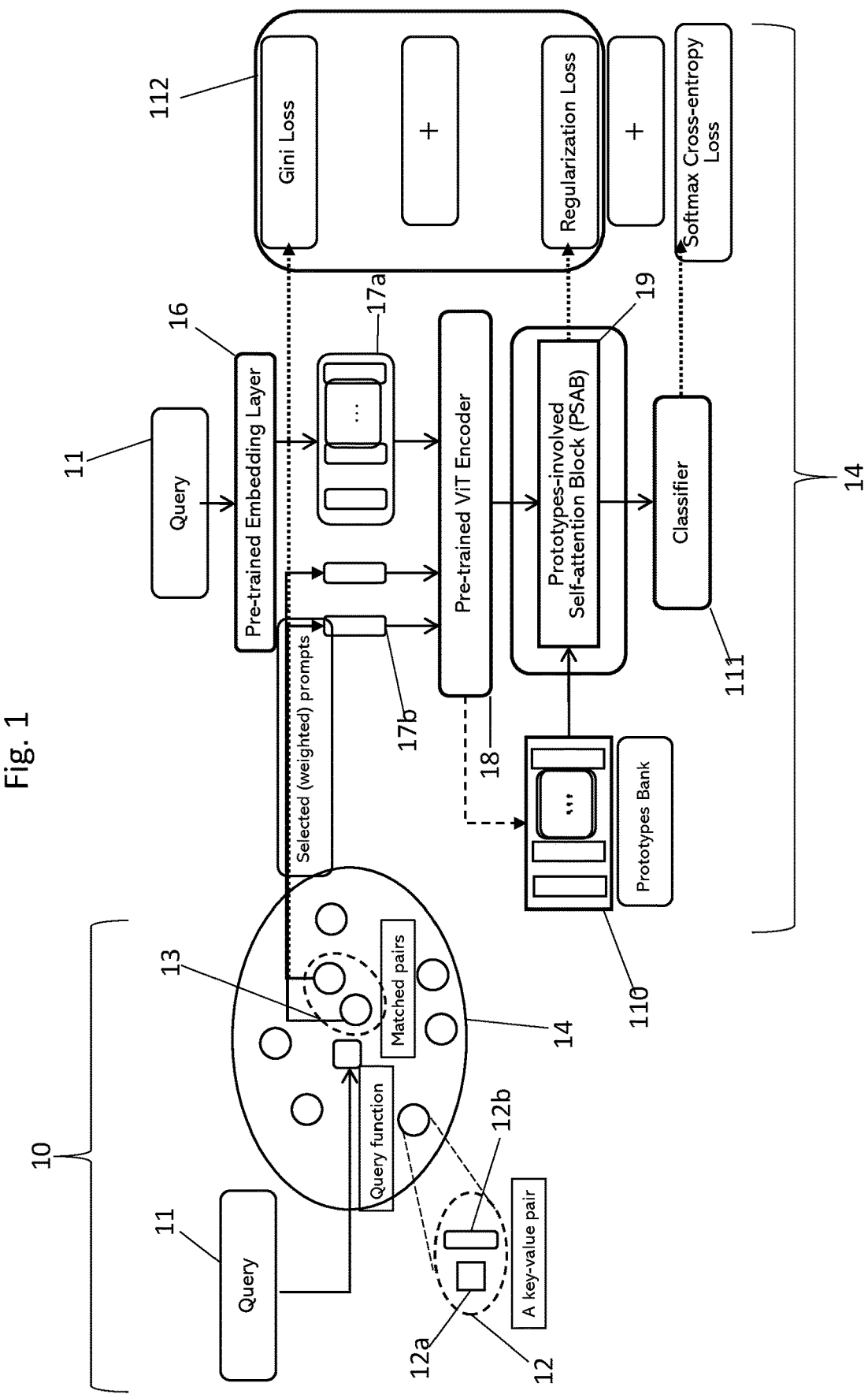
FIG. 1 is an abstract flow diagram of the method of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

For purposes of this application a "base" machine learning module (MLM) will be assumed to have been generated by any known or new process for training an MLM. The purpose of the invention is to allow the use of the base MLM in a dynamic environment where new tasks with new inputs are to be continually processed, using the new parameters associated with the new tasks to continually update the MLM before performing a new task. The state of the MLM after such new input processing is referred to herein as the "new" MLM. A new MLM comprises the previous MLM, whether the original/base MLM or an intermediate "new" MLM, after processing with the method of the invention. Whenever the "base" MLM is referenced, it should be understood to be either the original/first MLM, or the previous "new" MLM: there is no limit to the number of iterations of the method on a "base" MLM to produce a "new" MLM.

By referring to FIG. 1, a basic method according to an aspect of the invention can be understood. New task data set 10 is comprised of query set 11 which queries key-value prompt pairs 12 each comprised of a key 12a and a value 12b. Key-value prompt pairs are stored within learnable prompt pool 14. Learnable prompt pool 14 comprises query set 11 which operate on pre-trained embedding layer 16, which is "frozen" and comprises the original/base machine MLM's outcome data. For clarity, query set 11 is fed into both new task data set 10 and pre-trained embedding layer 16. Learnable prompt pool 14 is shared and used across all tasks: the "old" prompts from prior tasks are frozen while "new" tasks are optimized and updated. The data on which the base MLM was trained need not be available for performance of the method, saving valuable storage space and reducing transmission, storage, and processing times.

Selected (weighted) prompts 17b and prompts 17a are processed by a pre-trained Vision Translator (ViT) encoder which feeds base encoder outputs and base prototypes 110 into the prototype-involved self-attention block (PSAB) module 19. PSAB module 19 generates contextualized outputs for use by classifier 111. Selected (weighted) prompts are also fed from learnable prompt pool 14 into loss calculation module 112 to calculate a Gini loss (penalty—see below.) The Gini penalty, the regularization penalty, and a cross-entropy loss (penalty) are applied to optimize all the learnable parameters during the creation of the new MLM. The PSAB module also feeds parameters into the loss calculation module 112 to calculate regularization loss (penalty—see below). Regularization loss is applied to the PSAB parameters to prevent or minimize changes to parameters that are important to the output prediction.

FIG. 2 shows the steps of the method of FIG. 1 related to prototype computation. The process begins at Step 20 with intra-class samples at task level t, which corresponds to the base MLM. These are fed into the pretrained ViT encoder (see FIG. 1) in step 21 and features are extracted (see FIG. 4.) Once the features are extracted, a mean is computed (see FIG. 4). At the end of training in each task t (t=1, 2 . . . T). The mean of feature representations of each class produced by the ViT is computed as the prototypes:

$$p_c = \frac{1}{|ind_c|} \sum_{n=1}^{|ind_c|} f_n^c \in \mathbb{R}^D$$

where $\{ind_c\}$ is a set of indices of samples belonging to class c in the batch $$f_n^c$$

is the n-th feature embeddings of the corresponding class; and D is the feature dimension of encoder output.

In Step 23, dynamic prototypes aggregation is performed. The computed prototypes at the end of task t are denoted as $p_t$:

$$p_t = \{p_i\}_{i=1+\#seen\ classes\ until\ task\ (t-1)}^{\#seen\ classes\ until\ task\ t}$$

All the prototypes until task t are denoted as $P_t$:

$$P_t = [p_1, p_2, \ldots p_t] \in \mathbb{R}^{C_t \times D}$$

where $C_t$ is the total number of seen classes until task t. This yields an updated prototypes bank in Step 24.

After each task all prototypes are "frozen," creating a new base/existing prototypes bank for use in step 23. For the next new task, the method aggregates newly computed prototypes of the new task with the existing prototype bank, leading to:

$$P_{t+1} = [P_t; p_{t+1}]$$

Thus, $P_t$ is dynamically expanded after each increment of learning.

FIG. 3 shows the steps of the method of FIG. 1 related to PSAB block module creation. In Step 31, a batch output of the pretrained ViT encoder: $x_i \in \mathbb{R}^{bs \times D}$, where bs is the batch size is identified. In Step 32, the base prototypes bank (see FIGS. 1 and 2) is identified. In Step 33, the batch output and the base prototypes bank are concatenated along the feature dimension (see FIG. 2.)

At task t, denote $Z_i=[x_i; \ P_t] \in \mathbb{R}^{(bs+C_t) \times D}$, such that $O_i=PSAB(Z_i)$.

To form the PSAB module, three Multi-layer Perceptron ("MLP") algorithms for query, key and value projection are denoted as $W_q$, $W_k$ and $W_v$ respectively, where $W_q$, $W_k$, $W_v \in \mathbb{R}^{D \times D}$, and we then denote the Query, Key, and Value projections as $Q_i$, $K_i$, and $V_i$ respectively such that:

$$Q_i = W_q Z_i,$$
$$K_i = W_k Z_i,$$
$$V_i = W_v Z_i$$

Using the well-known Softmax function the method then turns the vector defined by $Q_i$, $K_i$, and $V_i$ into a probability distribution as follows:

$$A_i = \text{Softmax}\left(Q_i \cdot K_i^T / \sqrt{D}\right)$$

This probability distribution is then multiplied with the projected inputs of value in the new task in Step 36. In Step 37, the result of Step 36 is added to the original concatenation performed in Step 33, which results in the final outputs in Step 38.

$$O_i = (A_i V_i + Z_i)[:bs, \ :] \in \mathbb{R}^{bs \times D}$$

The PSAB module effectively integrates the prototype information with the original encoder outputs to generate contextualized outputs for classification.

FIG. 4 shows the steps of the method of FIG. 1 related to the calculation of regularization loss and Gini loss. In Step 41, inputs for the new task are passed to both the pre-trained ViT encoder for processing in Step 43 (see FIG. 1) and the new MLM for processing in Step 42.

As part of Step 42, a feature vector is calculated with a feature vector formula according to the following equation:

$$q(x) = f(x)[0, :]$$

where $q(x) \in \mathbb{R}^d$ is the output by the pre-trained ViT encoder.

In Step 44, the method computes the gradients of the new MLM outputs with regard to the PSAB parameters. (Unlike the frozen pre-trained embedding layer and ViT encoder used in Step 43, the PSAB module containing $\{W_q, W_k, W_v\}$ is continually updated task by task.) In Step 45, the importance of the individual parameters is assigned in such a way that in Step 46, the difference between each of the base/original PSAB parameters identified in Step 47 and the corresponding new PSAB parameter can be multiplied by the parameter's assigned importance to produce a final regularization loss in Step 48.

Regularization weight is calculated with the following formula:

$$L_{reg} = \alpha \sum_{i,j} \Omega_{ij} \left( \theta_{ij} - \theta_{ij}^* \right)^2$$

where $\alpha$ is a hyperparameter of the regularization, $$\theta_{ij}^*$$

is the recorded old parameter and $\Omega_{ij}$ is previously computed importance. The regularization loss for PSAB parameters is then used to prevent or reduce changes to parameters that are important for the output prediction as described in FIG. 1.

In Step 49, the process for calculating the Gini loss, which encourages prompt selection diversity as well as reducing prompt redundancy begins. The products of the normalized encoder outputs and the prompt keys are calculated to produce a vector. The vector is then processed with the well-known Softmax algorithm to produce a probability distribution.

In Step 410, the Gini penalty is calculated with a Gini penalty formula according to the following equation:

$$L_{gini} = \beta \sum_{k=1}^{K} \left( \frac{1}{B} \sum_{i=1}^{B} s_{i,k} \right)^2$$

Specifically, given a batch of B queries, $s_{i,k}$ is the probability (out of the probability distribution calculated in Step 49) between a query and K keys, and $\beta$ is the Gini loss weight. By imposing the Gini impurity-based penalty on query-key similarity, the optimization has a higher probability of finding a solution in which query features are distributed more evenly to the prompt keys. This produces a calculated Gini loss in Step 411.

The final loss to be applied (see FIG. 1) consists of cross-entropy loss (a known calculated loss type in the field of the invention, see FIG. 1) PSAB regularization loss and Gini prompting loss.

Figure 5:
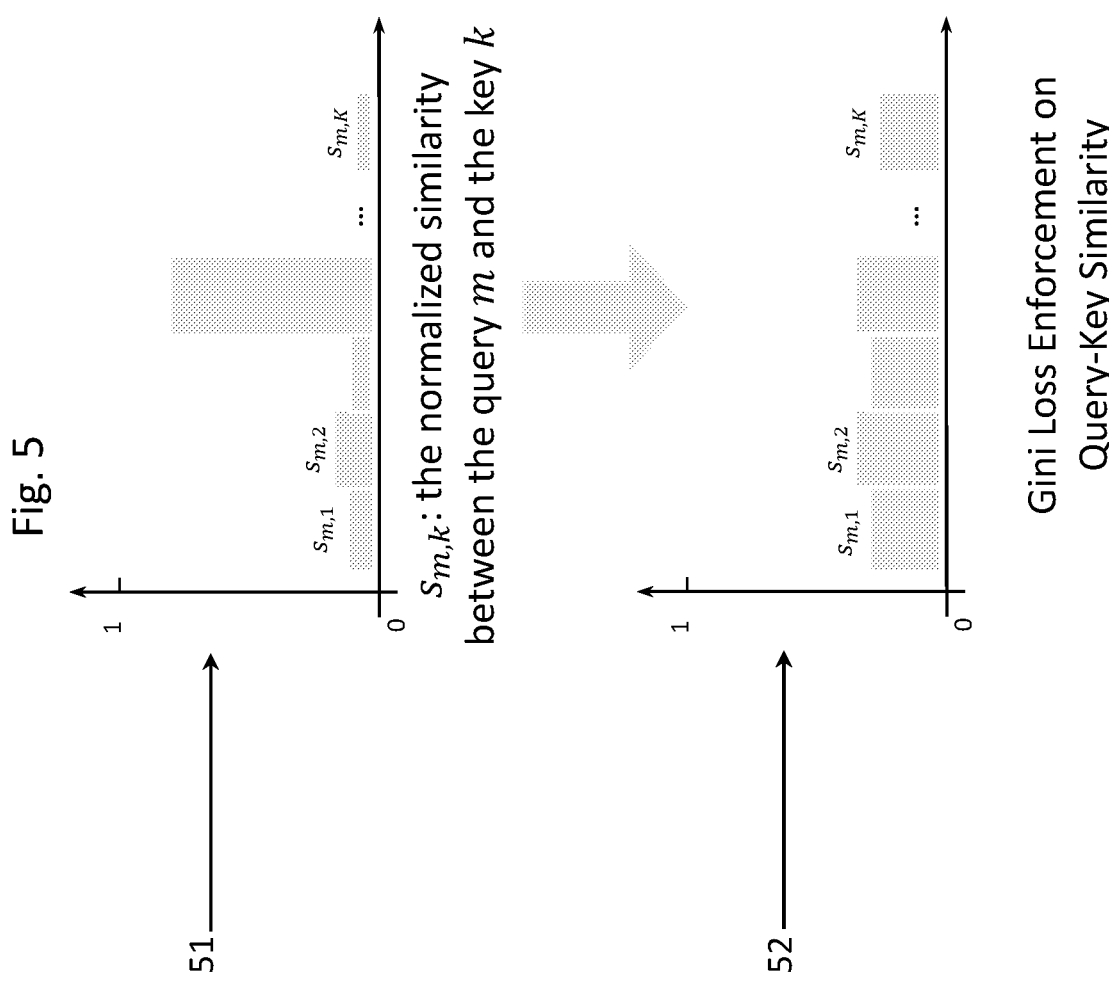
FIG. 5 is a graph showing a comparison between an example similarity between a query and a key using existing methods, and an example similarity between a query and a key using the method of the invention.

FIG. 5 shows the effect of application of the Gini loss penalty on query-key similarity compared to existing methods. The top graph 51 shows that the normalized similarity s between a query m and the associated key k is very divergent after application of existing continual learning methods. The bottom graph 52 shows that the query-key similarity is very consistent after application of the Gini loss penalty. This demonstrates that the method of the invention is much more suitable than existing methods for retaining base task training while updating the machine learning model with new task inputs.

Figure 6:
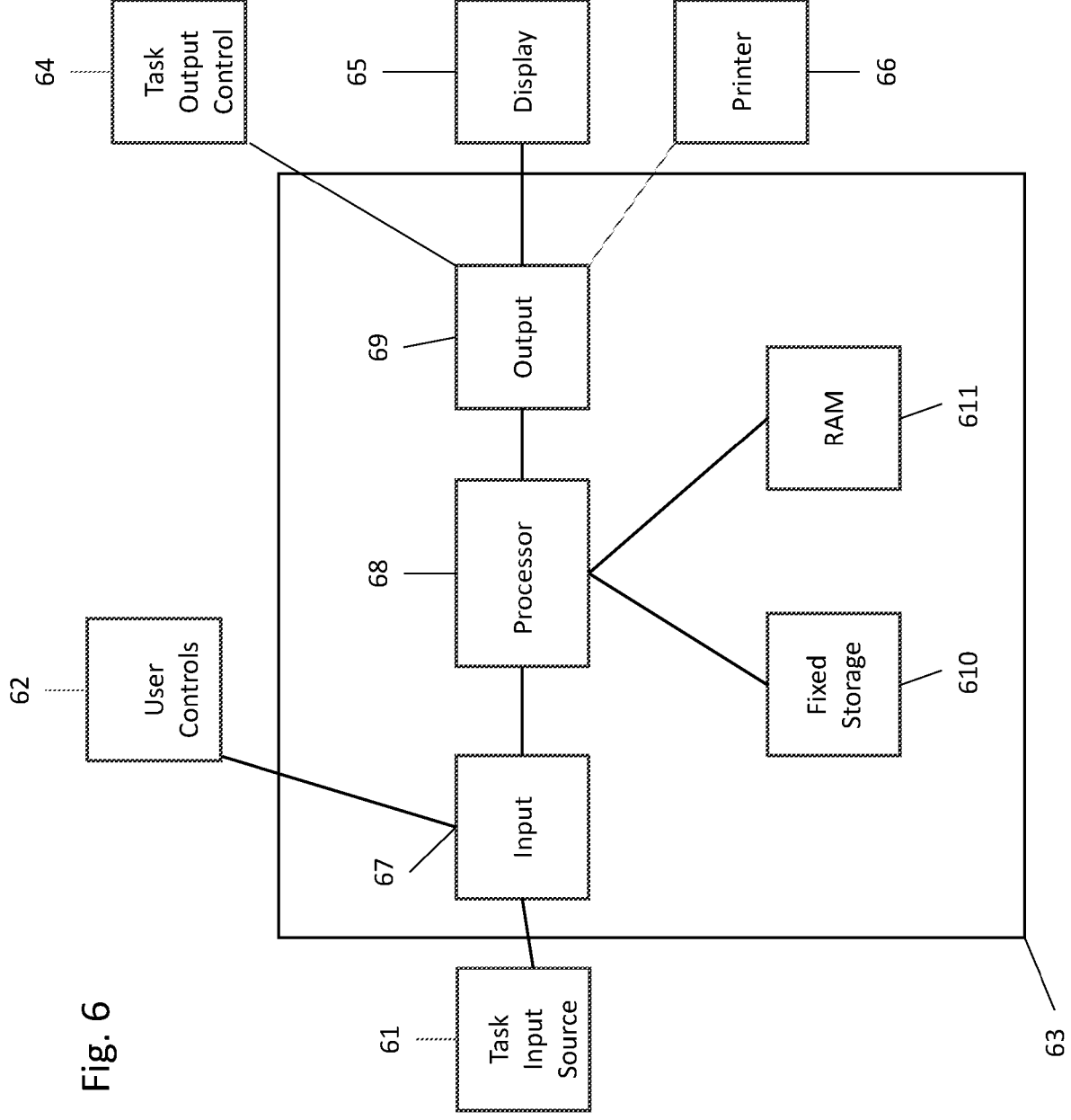
FIG. 6 is an abstract schematic of an apparatus for implementing the method of the invention.

FIG. 6 shows a block diagram of an apparatus for implementing the method of FIG. 1. User controls 62 and task input source 61 are connected to an input system 67, which could comprise a Bluetooth® connection, a USB connection, a proprietary hardwired or wireless system, or any other means of connecting them as desired. Task input source 61 could comprise one or more input sources, such as a camera, a mechanical counter, an optical or mechanical measurement system, et cetera. For example, a camera could create visual input data showing an assembly line input pushing various parts along the line for use in an assembly system. Input system 67 (which can also constitute two or more separate systems, one for each input source) sends the user control inputs and the task input source data to processor 68. Fixed storage 610 (which could be a hard drive, a solid state drive, flash RAM, or any other desired means of persistently storing information) and/or random access memory (RAM) 611 contain(s) a software program or "instruction" having multiple executable code elements embodying the method of the invention which are executed by processor 68. Note that processor 68 could compromise a CPU, a GPU, a proprietary processor, or any reasonable combination thereof. Input data and processing data generated while applying the various steps of the method of the invention are also stored in RAM 611 and/or fixed storage 610. Once the inputs have been processed by processor 68 and the final generated task outputs stored in fixed storage 610 and/or RAM 611 (or offloaded to cloud storage, portable storage, or otherwise stored in final form for review) the final generated task outputs can be displayed on display 65, printed on printer 66, and/or sent to a task output control system 64, which can control one or more mechanisms which implement the task outputs. For instance, the apparatus might determine that certain parts are currently being used more often than other parts, and control the assembly line such that the more often used parts are input into the assembly system at a higher rate. If these parameters change, for instance because a new operator prefers to assemble the parts in a different order or at a different rate, the continual learning input will change the control output accordingly, controlled by the relative importance of each part et cetera.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for prompting-based rehearsal-free continual learning with dynamic prototype-involved self-attention comprising the steps of:
   creating a base machine learning model using a base training input;
   defining a new task to apply the base machine learning model, each new task including a new training input determined during a new training stage;
   computing at least one new class-wise prototype after the new training stage of the new task;

conducting self-attention for a prototype-involved self-attention module using the at least one new class-wise prototype;

determining one or more important parameters of the prototype-involved self-attention module;

applying a penalty to changes to the one or more important parameters of the prototype-involved self-attention module;

applying the prototype-involved self-attention module including the penalty to the base machine learning model to create a new machine learning model; and using the new machine learning model to perform the new task.

2. The method of claim 1, wherein the computing a new class-wise prototype after the training stage of the new task further comprises:

extracting one or more extracted features of one or more samples belonging to a class of the new task from a vision transformer encoder;

summing up all the extracted features of the class;

dividing by a count of the samples to compute a mean feature vector.

3. The method of claim 2, wherein the extracting one or more extracted features from the vision transformer encoder further comprises:

using the base machine learning model as a frozen feature extractor to get one or more query features;

applying cosine similarity to score one or more matches between the query features and one or more prompt keys associated with the query features and select a number of prompts associated with the prompt keys; and feeding an adapted embedding feature into the base machine learning model as part of creating the new machine learning model.

4. The method of claim 1, wherein the conducting self-attention for a prototype-involved self-attention module further comprises:

concatenating all the existing prototypes and the ViT encoder features to generate contextualized inputs;

going through query, key, and value projections by three linear layers, respectively;

computing the product of projected query and key inputs followed by computing a Softmax score;

computing the product of the Softmax score and the projected value input;

adding the results to the original contextualized inputs; and extracting corresponding batch size locations along the first dimension for classifier prediction.

5. The method of claim 1, wherein the applying a penalty to changes to the one or more important parameters of the prototype-involved self-attention module further comprises:

assigning a relative importance factor to each of the one or more important parameters;

summarizing one or more loss values between one or more base parameter values of the base machine learning model and an associated current parameter value of the new machine learning model depending on the assigned relative importance factor.

6. The method of claim 5, wherein the assigning a relative importance factor further comprises:

computing a gradient of a squared l2 norm of one or more base machine learning model outputs with regard to each of the one or more important parameters;

accumulating one or more absolute values of the gradients over one or more base machine learning model inputs and taking a mean value as the base relative importance factor;

accumulating one or more absolute values of the gradients over one or more new machine learning model inputs and taking a second mean value as a new relative importance factor; and calculating a final relative importance factor as a weighted combination of the base relative importance factor and the new relative importance factor.

7. The method of claim 5, wherein the summarizing one or more loss values between one or more base parameter values of the base machine learning model and an associated current parameter value of the new machine learning model depending on the assigned relative importance factor further comprises:

multiplying the changes between the updated parameter and the recorded old parameter by the importance, and adding together results from all the parameters and multiplying by the regularization weight.

8. The method of claim 1, wherein the encouraging prompts selection diversity for better prompting learning further comprises:

initializing a set of prompts with associated keys for each new task;

forward passing a projected input of the set of prompts with associated keys to the base machine learning model to get a query feature;

normalizing the query feature and the associated keys respectively and computing a product result;

applying a Softmax function to the product result to obtain a set of probability-like outputs;

computing a Gini penalty; and applying the Gini penalty to the set of probability-like outputs.

9. The method of claim 8, wherein the forward passing the projected input to the base machine learning model to get the query feature further comprises extracting a feature vector with a feature vector formula and applying the feature vector to the projected input.

10. The method of claim 8, wherein the computing the Gini penalty on the probability-like outputs further comprises:

calculating the Gini penalty with a Gini penalty equation;

applying the Gini penalty to the probability-like outputs.

11. An apparatus, comprising a processor coupled to a memory, a fixed storage system, a task input source, and a task output control, wherein the fixed storage system is configured to store an instruction, and the processor is configured to execute the instruction stored in the memory for:

accessing a base machine learning model created using a base training input;

defining a new task to apply the base machine learning model, each new task including a new training input determined during a new training stage and obtained from the task input source;

computing at least one new class-wise prototype after the new training stage of the new task;

conducting self-attention for a prototype-involved self-attention module using the at least one new class-wise prototype;

determining one or more important parameters of the prototype-involved self-attention module;

applying a penalty to changes to the one or more important parameters of the prototype-involved self-attention module;

applying the prototype-involved self-attention module including the penalty to the base machine learning model to create a new machine learning model; and using the new machine learning model to perform the new task via the task output control.

* * * * *